May 25, 1965   J. C. RUNCO ETAL   3,185,285
MECHANISM FOR FEEDING CLOSURES
Filed Oct. 5, 1962   3 Sheets-Sheet 3
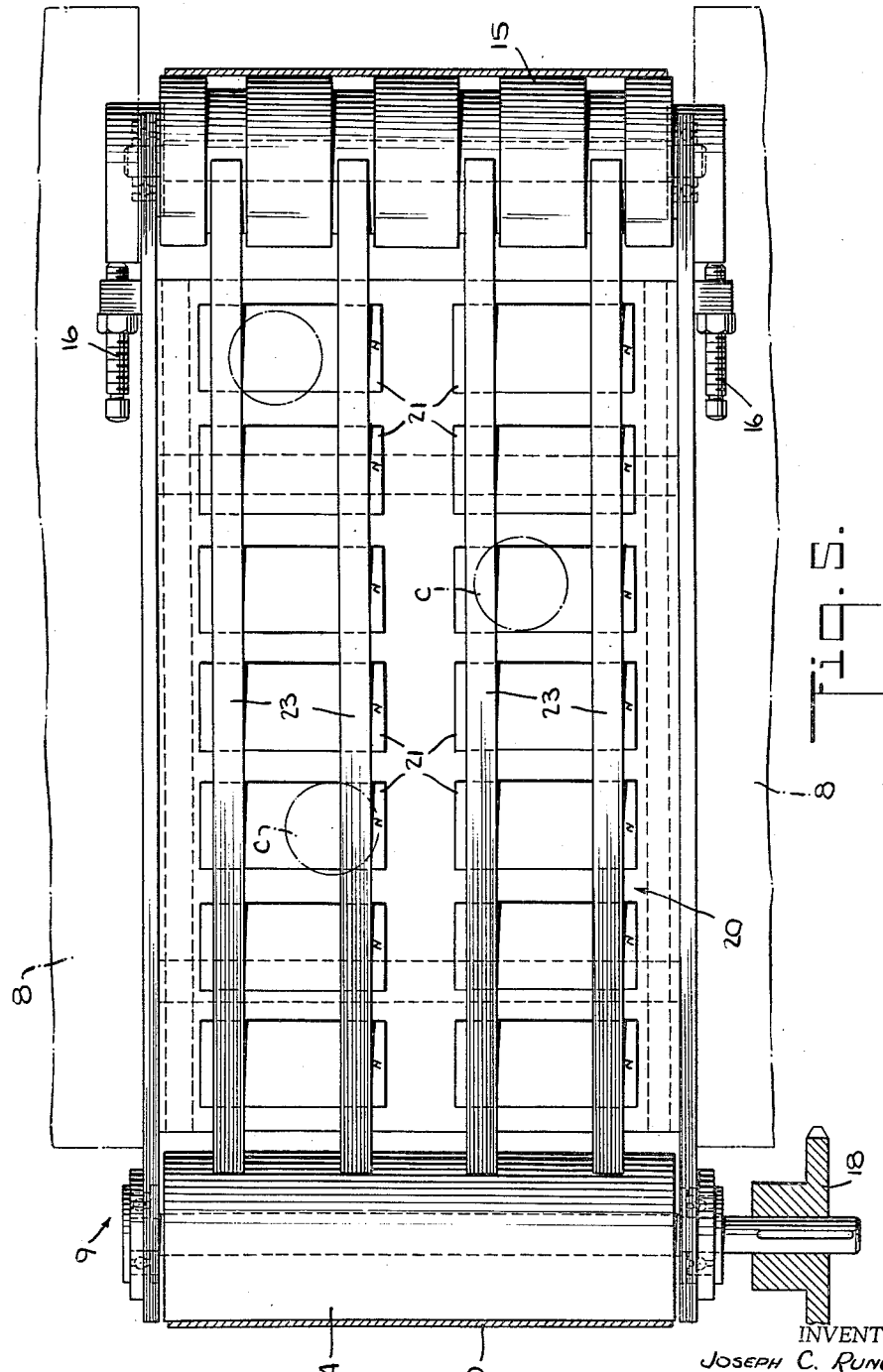
Fig. 5.
INVENTORS
JOSEPH C. RUNCO
HARRY WILLIAM HOEHN
BY
ATTORNEY United States Patent Office 3,185,285
Patented May 25, 1965

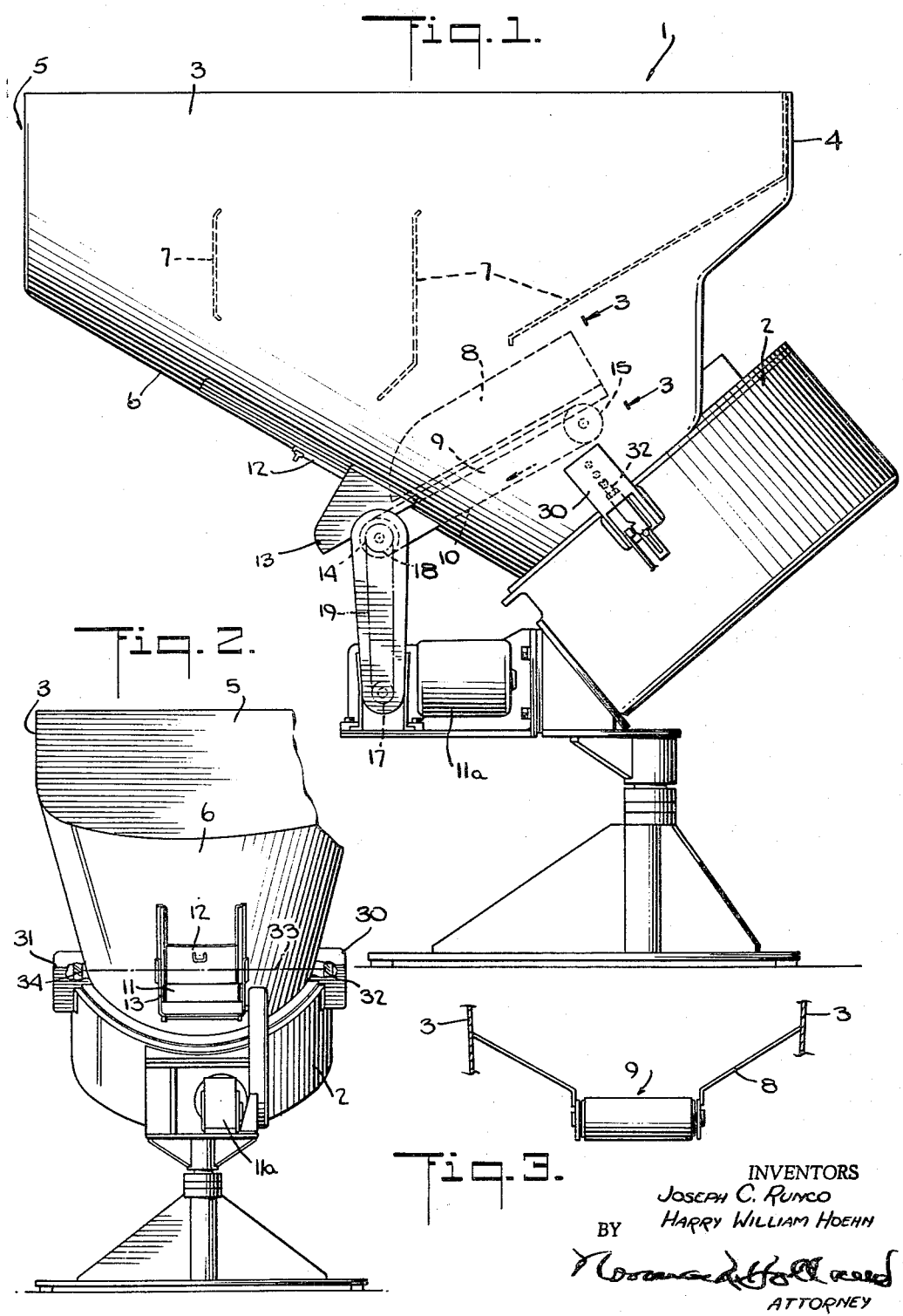

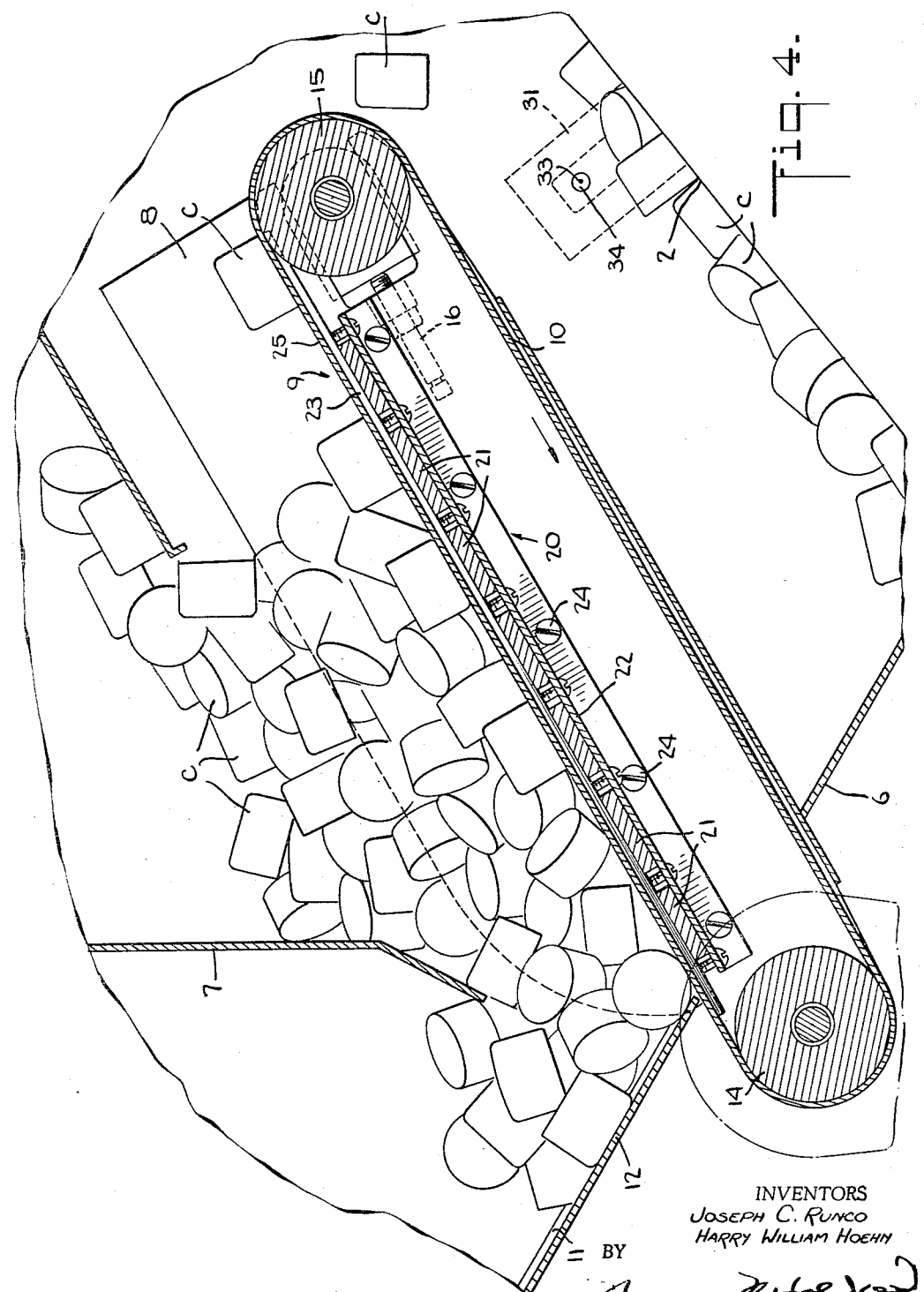

3,185,285
MECHANISM FOR FEEDING CLOSURES
Joseph C. Runco and Harry William Hoehn, Lancaster, Ohio, assignors to Anchor Hocking Glass Corporation, Lancaster, Ohio, a corporation of Delaware
Filed Oct. 5, 1962, Ser. No. 228,618
6 Claims. (Cl. 198—52)

The present invention relates to a mechanism for feeding closure caps and more particularly to an improved mechanism for delivering closure caps from a storage bin or reservoir to a selector hopper.

In sealing packages a closure cap is usually applied to the mouth of a container to form a hermetic seal. Ordinarily the closure caps are stored in a bin or reservoir and are fed to a rotating selector hopper by a gravity feed arrangement. The selector hopper unscrambles the closure caps, places them in the proper position and feeds the closure caps one-by-one to a sealing machine which applies the closure caps to the containers to form a sealed package.

Recently, high speed mechanisms have been developed which seal containers at increased rates of speed. It has been discovered that the ordinary storage bins which have been used with previous slower sealing machines are inadequate to feed the closure caps to the hoppers at the increased rate required by the improved sealing machines. The lack of a suitable feed mechanism has resulted in inefficient operation of the improved sealing machines.

The present invention provides for an improved mechanism for feeding closure caps to a selector hopper which will feed the closure caps at a faster rate than has heretofore been the practice.

Another object of the present invention is to provide an improved mechanism for positively feeding the closure caps from a storage bin to the hopper at a faster rate.

Another object of the present invention is to provide an improved means for controlling the level of closure caps in the selector hopper so that the level of closure caps in the hopper will control the amount of caps fed to the hopper.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of the improved bin and hopper made in accordance with the present invention;

FIG. 2 is a front elevational view of the bin and hopper shown in FIG. 1;

FIG. 3 is a sectional view taken along lines 3—3 of FIG. 1;

FIG. 4 is an enlarged sectional view showing in detail improved conveyor for feeding the closure caps from the storage bin to the hopper; and FIG. 5 is a top view of the conveyor shown in FIG. 4.

Referring more particularly to FIGS. 1 to 3 of the drawings, the invention comprises a storage bin or reservoir 1 located above a rotating hopper 2 adapted to receive a plurality of articles such as the closure caps C, shown in FIG. 4. The bin 1 is comprised of a pair of side walls 3, front and rear walls 4 and 5, a bottom wall 6 and is open at the top.

Located within the bin is a series of baffles 7 so arranged as to direct the closure caps C to an inclined chute 8. The chute 8 is adapted to deposit the closure caps onto a conveyor 9 which receives them and deposits them onto the rotating hopper 2. The lower wall 6 of the bin 1 is provided with an exit opening 11 controlled by a slidable door 12 to give access to the interior of the bin 1 and to permit the bin to be emptied of closure caps when desired. An exit chute 13 is positioned beneath the door 12 and in line with the internal chute 8 to act as an exit guide for the closure caps when the bin is to be emptied.

The rotating hopper 2 may be any suitable type of well known selector hopper such as the one shown in United States Patent No. 3,029,918, dated April 17, 1962. Such a selector hopper comprises a rotating disc (not shown) having a plurality of permanent magnets imbedded in a peripheral zone to permit selection of the closure caps. Of course, it will be understood that any conventional selector hopper may be used with the present invention.

The feeding conveyor 9 is inclined and comprises an endless belt 10 between a pair of rollers 14 and 15. The roller 15 is adjustable by means of adjusting screw mechanism 16 to give the proper tension to the belt 10 and the other roller 14 is driven by a suitable drive motor mechanism 11 through the intermediation of pulleys 17 and 18 and chain belt 19.

A magnet assembly 20 (FIG. 4) is positioned beneath the upper run of the conveyor belt 10. The magnet assembly 20 comprises a plurality of magnets 21 which are mounted in a double row on a holding bracket 22. A pair of retaining strips 23 cooperates with the holding bracket 22 to hold the magnets 21 securely in place. The magnet assembly 20 is mounted beneath the upper run 25 of the belt by any suitable means, such as the bolts 24. While the magnets 21 are shown in the drawings as being permanent magnets, it will be understood that other types of magnets, such as electro-magnets, may also be utilized.

The caps C which are deposited on the conveyor belt will be retained on the conveyor belt by the field of the magnets 21. When the caps reach the end of the conveyor the caps are beyond the magnetic field of the magnets 21 and will drop onto the rotating selector hopper 2.

It will be understood that while in the preferred embodiment of the invention as shown in the drawings, the conveyor 9 is provided with a magnet assembly 20 to hold the closure caps C in place, it will be understood that it is within the scope of the present invention to use a cleated conveyor or the usual smooth conveyor belt to accomplish the same purpose.

Feed control means, in the form of a sensory device, is provided in the hopper 2 to control the level of the caps on the rotating hopper. Such control means are shown in the drawings as comprising a light emitting assembly 30 mounted adjacent one side of the hopper 2 (FIG. 2) and a light sensitive impulse responsive assembly 31 mounted adjacent the other side of the hopper 2. The electric eye assembly 30 has a source of light 32 therein (FIG. 2) which emits a beam of light 33 across the top of the hopper. The light beam 33 impinges on a light sensitive device 34. When the level of the closure caps C in the hopper 2 reaches a predetermined height, the light beam 33 is interrupted so that a suitable mechanism (not shown) will be energized to either stop the conveyor or reduce the speed thereof so as to regulate the flow of closure caps to the hopper. This condition persists until the level of the closure caps C on the hopper is below the level of the beam 33 at which point the feeding of closure caps is resumed. Preferably the height of the electric eye assembly is adjustable to permit the level of closures to be adjusted.

It will be understood that while an electric eye assembly is shown in the drawings, an electric contact, proximity detector, or some other sensory device may be used in the same manner as the electric eye assembly which is shown in the drawings.

The operation of the device will be obvious from the description of the drawings of this invention.

Closure caps C are deposited into the bin 1 through the open top and are directed by baffles 7 within the bin 1 towards the inclined chute 8 which in turn deposits of the caps on the belt 10 of the conveyor 9. The caps are held on the belt 10 by the magnetic field of the permanent magnets 21. The rotating conveyor moves the closure caps upwardly until they reach the edge of the conveyor at which point they are dropped onto the rotating hopper 2.

The rotating hopper 2 feeds closure caps to a sealing machine (not shown). If the level of the closure caps on the hopper reaches a predetermined height they will interrupt the beam 33 of the electric eye assembly and will either stop or reduce the rate of flow so that a lesser number of closure caps will be deposited on the hopper. This condition persists until the level of the closure caps in the hopper is below the electric eye beam at which point the feeding of the closure caps is resumed at the normal predetermined rate.

It will be seen that the present invention provides an improved hopper and bin permitting closure caps to be fed to the hopper at greater speeds and which will permit the closure caps to be fed positively to the hopper. The invention also controls the level of the closure caps and prevents jamming.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described the invention, it is claimed:

1. A cap feeding mechanism comprising a bin to receive closure caps, a rotatable hopper below said bin, said bin being affixed to and mounted on top of said hopper, said hopper communicating with said bin and adapted to receive closure caps therefrom, and a moving conveyor within said bin at the lower portion thereof and above said hopper and being adapted to transfer closure caps from said bin to said hopper and sensing means associated with said hopper to sense the level of closure caps on the hopper and control the deposition of closure caps on said hopper.

2. A cap feeding mechanism as claimed in claim 1, wherein magnetic means are provided beneath the upper run of the conveyor.

3. A cap feeding mechanism comprising a bin to receive closure caps, a rotatable hopper below said bin, said bin being affixed to and mounted on top of said hopper, said hopper communicating with said bin and adapted to receive closure caps therefrom, a light beam assembly comprising a light source along one edge of the hopper, said light beam assembly being adapted to sense the level of said closure caps on said hopper and means responsive to said light beam assembly to control the rate of deposition of closure caps on said hopper.

4. A cap feeding mechanism as claimed in claim 3, wherein magnetic means are provided beneath the upper run of the conveyor.

5. A cap feeding mechanism comprising a bin to receive closure caps, a rotatable hopper below said bin, said bin being affixed to and mounted on top of said hopper, said hopper communicating with said bin and adapted to receive closure caps therefrom, a moving conveyor within said bin at the lower portion thereof and above said hopper to transfer closure caps from said bin to said hopper, a light beam assembly at one edge and a light sensitive device at the other edge of the hopper, said light beam assembly being adapted to sense the level of said closure caps on said hopper and means operable by said light sensitive device in response to the light impinging thereon by said light beam assembly to control the speed of the conveyor and the rate of deposition of closure caps on said hopper.

6. A cap feeding mechanism as claimed in claim 5, wherein magnetic means are provided beneath the upper run of the conveyor.

References Cited by the Examiner
UNITED STATES PATENTS

| | | |
|---|---|---|
| 582,988 | 5/97 | Hoyte. |
| 2,124,018 | 7/38 | Vogel-Jorgensen _____ 214—17.62 |
| 2,684,788 | 7/54 | Bland _____ 222—328 |
| 2,937,738 | 5/60 | Albertali _____ 198—43 |

SAMUEL F. COLEMAN, *Primary Examiner.*

WILLIAM B. LABORDE, *Examiner.*